United States Patent
Iimura et al.

(10) Patent No.: US 12,415,923 B2
(45) Date of Patent: Sep. 16, 2025

(54) CURABLE SILICONE COMPOSITION AND CURED PRODUCT OF SAME

(71) Applicant: DOW TORAY CO., LTD., Tokyo (JP)

(72) Inventors: Tomohiro Iimura, Ichihara (JP); Takakazu Hino, Ichihara (JP); Haruhiko Furukawa, Ichihara (JP)

(73) Assignee: DOW TRAY CO., LTD., Tokyo (JP)

(*) Notice: Subject to any disclaimer, the term of this patent is extended or adjusted under 35 U.S.C. 154(b) by 305 days.

(21) Appl. No.: 18/018,996

(22) PCT Filed: Jun. 21, 2021

(86) PCT No.: PCT/JP2021/023401
§ 371 (c)(1),
(2) Date: Jan. 31, 2023

(87) PCT Pub. No.: WO2022/030120
PCT Pub. Date: Feb. 10, 2022

(65) Prior Publication Data
US 2023/0295429 A1      Sep. 21, 2023

(30) Foreign Application Priority Data
Aug. 6, 2020    (JP) .................... 2020-134028

(51) Int. Cl.
*C08L 83/04*       (2006.01)

(52) U.S. Cl.
CPC ......... *C08L 83/04* (2013.01); *C08L 2205/035* (2013.01)

(58) Field of Classification Search
CPC ... C08L 83/04; C08L 2205/035; C08G 77/12; C08G 77/20
See application file for complete search history.

(56) References Cited

U.S. PATENT DOCUMENTS

| | | |
|---|---|---|
| 5,792,723 A | 8/1998 | Keno et al. |
| 2005/0209400 A1* | 9/2005 | Tsumura .................. C08K 5/54 257/E33.059 |
| 2006/0094834 A1 | 5/2006 | Aoki et al. |
| 2011/0111217 A1 | 5/2011 | Kuroda et al. |
| 2019/0225806 A1* | 7/2019 | Muramatsu ............. C08L 83/06 |
| 2020/0115603 A1 | 4/2020 | Yamazaki et al. |
| 2020/0224069 A1 | 7/2020 | Itoh et al. |
| 2021/0363389 A1 | 11/2021 | Hino et al. |
| 2022/0282142 A1 | 9/2022 | DeGroot, Jr. et al. |

FOREIGN PATENT DOCUMENTS

| | | |
|---|---|---|
| JP | H109141107 A | 6/1997 |
| JP | 2006152266 A | 6/2006 |
| JP | 2011026582 A | 2/2011 |
| JP | 2011102336 A | 5/2011 |
| JP | 2014047310 A | 3/2014 |
| JP | WO2019167479 A1 | 2/2021 |
| JP | 7244198 B2 | 3/2023 |
| WO | 2011002101 A2 | 1/2011 |
| WO | 2019003995 A1 | 1/2019 |
| WO | 2019009175 A1 | 1/2019 |
| WO | 2020121930 A1 | 6/2020 |

OTHER PUBLICATIONS

English translation of International Search Report for PCT/JP2021/023401 dated Sep. 7, 2021, 2 pages.
Machine assisted English translation of JP2014047310A obtained from https://worldwide.espacenet.com/patent on May 4, 2023, 17 pages.

* cited by examiner

*Primary Examiner* — Robert S Jones, Jr.
*Assistant Examiner* — Lily K Sloan
(74) *Attorney, Agent, or Firm* — WARNER NORCROSS + JUDD LLP

(57) ABSTRACT

This disclosure relates to a curable silicone composition that contains little to no solvent, has excellent transparency and adhesion to a substrate, and has a low overall haze value, and also relates to a cured product thereof. The curable silicone composition comprises: 100 mass parts of (A) a chain organopolysiloxane having an aliphatic unsaturated carbon-carbon bond-containing group and a degree of siloxane polymerization (DP) within a range of 10 to 1000; 1 to 100 mass parts of (B) a chain organopolysiloxane having an aliphatic unsaturated carbon-carbon bond-containing group and having a DP within a range of 1001 to 10,000; 0 to 100 mass parts of (C) an organopolysiloxane resin; (D) a polyorganohydrogen siloxane; and (E) a catalytic amount of a hydrosilylation reaction catalyst. Optionally, the composition further comprises: 0 to 60 mass parts of (F) an organic solvent, for 100 mass parts of the sum of components (A) to (D).

20 Claims, No Drawings

CURABLE SILICONE COMPOSITION AND CURED PRODUCT OF SAME

CROSS-REFERENCE TO RELATED APPLICATIONS

This application is the U.S. National Stage of International Application No. PCT/JP2021/023401 filed on 21 Jun. 2021, which claims priority to and all advantages of Japanese Application No. 2020-134028 filed on 6 Aug. 2020, the content of which is incorporated herein by reference.

TECHNICAL FIELD

The present invention relates to a curable silicone composition that contains little to no solvent, has excellent adhesion and transparency of a substrate, and has low total haze values. Furthermore, the present invention relates to a cured product obtained by curing the composition.

BACKGROUND ART

Polysiloxane curable silicone compositions have excellent electrical insulating properties, heat resistance, cold resistance, and adhesion to various adherends, in comparison to acrylic or rubber-based pressure sensitive adhesive compositions, and are therefore used in heat-resistant adhesive tapes, electrically insulating adhesive tapes, heat seal tapes, plating masking tapes, and the like. The polysiloxane curable silicone compositions are classified based on the curing mechanisms thereof, such as addition reaction curing types, condensation reaction curing types, peroxide curing types, and the like. Addition reaction curing type pressure sensitive adhesive compositions are widely used because the compositions cure quickly when left to stand at room temperature or by heating and do not generate by-products.

Taking advantage of the aforementioned properties of polysiloxane curable silicone compositions as well as properties which can provide high transparency thereof as required, applications in the field of advanced electronic materials and display elements such as smart devices and the like have been studied in recent years. Such a device has a structure in which a film made of a plurality of layers, including an electrode layer and a display layer, is interposed between transparent substrates, and it is anticipated that the polysiloxane silicone curable composition having excellent heat resistance and cold resistance will function effectively in an article and a manufacturing process thereof for the purpose of protecting the electrode layer and the display layer and improving adhesion between layers.

However, polysiloxane curable silicone compositions are generally sold after being dissolved in organic solvents, so applications are limited. Particularly in recent years, the development of solvent-free or low-solvent polysiloxane curable silicone compositions is strongly desired due to the trends in environmental regulations around the world. Furthermore, in the manufacturing process of electronic components, there is also a strong need for curable silicone compositions with improved properties such as low solvent content, low haze, transparency, and easy removal after use.

PRIOR ART DOCUMENTS

Patent Documents

Patent Document 1: U.S. Pat. No. 4,678,471
Patent Document 2: U.S. Pat. No. 5,338,626
Patent Document 3: Japanese Unexamined Patent Application 2014-047310

SUMMARY OF THE INVENTION

Problem to be Solved by the Invention

The present invention resolves the aforementioned problems, and an object thereof is to provide a curing reactive silicone composition that has a viscosity that allows coating even with low solvent content, has excellent curability, that forms a silicone cured product (particularly, a cured film) having favorable adhesion to a substrate, high transparency, low total haze value, and easy removal from a substrate surface after use, as a result of a curing reaction, and to provide a cured product thereof.

Means for Solving the Problem

As a result of conducting diligent research on the problem described above, the present inventors arrived at the present invention. In other words, one object of the present invention is achieved by a curable silicone composition, containing:
  100 mass parts of (A) a straight chain or branched chain organopolysiloxane having at least two aliphatic unsaturated carbon-carbon bond-containing groups in a molecule and a degree of siloxane polymerization within a range of 10 to 1000;
  1 to 100 mass parts of (B) a straight chain or branched chain organopolysiloxane having at least two aliphatic unsaturated carbon-carbon bond-containing groups in a molecule and having a degree of siloxane polymerization within a range of 1001 to 10,000 for 100 mass parts of component (A);
  0 to 100 mass parts of (C) an organopolysiloxane resin, containing in a molecule, siloxane units (M units) expressed by $R^3SiO_{1/2}$ (where R mutually independently represents a monosaturated organic group) and siloxane units (Q units) as expressed by $SiO_{4/2}$, for 100 mass part of component (A);
  (D) polyorganohydrogen siloxane; and
  (E) a catalytic amount of a hydrosilylation reaction catalyst;
  and further comprising:
  0 to 60 mass parts of (F) an organic solvent, for 100 mass parts of the sum of components (A) to (D).

Furthermore, the problem of the present invention is also solved by a silicone cured product made by curing the curable silicone composition described above.

Effects of the Invention

The curable silicone composition of the present invention has a viscosity that allows coating even with low solvent content, has excellent curability through a hydrosilylation reaction, cures to form a silicone cured product (particularly cured film) layer that has sufficient adhesion to the substrate for practical use, is highly transparent, has a low overall haze value, and can be easily removed from the substrate surface after use.

MODE FOR CARRYING OUT THE INVENTION

[Curable Silicone Composition]
First, the curable silicone composition according to the present invention will be described. The composition cures quickly by a curing reaction including a hydrosilylation reaction to form an adhesive layer that has sufficient adhesion to a substrate for practical use, is highly transparent, has a low overall haze value, and can be easily removed from the surface of the substrate after use.

Specifically, the curable silicone composition of the present invention contains the above component (A) to component (E), and from the perspective of handling workability, may optionally contain (F) an arbitrary organic solvent, and may also contain a curing retarder and other additives to the extent that the object of the present invention is not impaired. Hereinafter, each component will be described. Note that component (C) and component (F) are optional components of the composition, and the amount in the composition may be zero.

[Component (A)]

Component (A) is a straight chain or branched chain organopolysiloxane having at least two aliphatic unsaturated carbon-carbon bond-containing groups in the molecule and a degree of siloxane polymerization in the range of 10 to 1000, and is the main agent (base polymer) of the composition. Component (A) is involved in the curing reaction together with component (B) and component (D) in the hydrosilylation reaction.

By using a specific amount of component (A) together with component (B), a structure with an extended molecular chain length is included in an amount above a certain level in the curing reactant obtained by curing the present composition, and the adhesion as an elastic adhesive member is remarkably improved. Furthermore, component (A) is a siloxane component with a relatively low degree of polymerization; therefore, the viscosity and coatability of the composition can be adjusted without using a large amount of organic solvent while maintaining the strength of the silicone adhesive layer by adjusting the degree of siloxane polymerization, and the desired film thickness from thin films to thick films can be formed. Component (A) may be a single organopolysiloxane or a mixture of two or more organopolysiloxanes.

The degree of siloxane polymerization of the organopolysiloxane, which is component (A), is in a range of 10 to 1000, preferably in a range of 50 to 1000, and more preferably in a range of 100 to 1000. Furthermore, Component (A) may be:

(A1) an organopolysiloxane having a degree of siloxane polymerization in a range of 10 to 1000, preferably 50 to 1000, and having an aliphatic unsaturated carbon-carbon bond-containing group only at both ends of the molecular chain; or (A2) an organopolysiloxane having a degree of siloxane polymerization in a range of 10 to 1000, preferably 50 to 1000, and having an aliphatic unsaturated carbon-carbon bond-containing group at both ends of the molecular chain or a side chain; or a suitable mixture of organopolysiloxanes with a degree of siloxane polymerization in a range of 31 to 1000. If the degree of siloxane polymerization of component (A) exceeds the upper limit described above, the viscosity of the entire composition tends to increase, and coating may become difficult unless a large amount of organic solvent is used. On the other hand, if the degree of siloxane polymerization of component (A) is less than the lower limit described above, the curability and adhesive performance of the composition may be degraded.

The organopolysiloxane, which is component (A), has at least two aliphatic unsaturated carbon-carbon bond-containing groups at the ends of the molecular chain or a side chain, in order to cure by a hydrosilylation reaction. Examples of such aliphatic unsaturated carbon-carbon bond-containing groups include an alkenyl group, an alkenyloxyalkyl group, an acryloxyalkyl group or a methacryloxyalkyl group, and an alkenyl group is particularly preferred. Specifically, the alkenyl group is a vinyl group, an allyl group, a propenyl group, a butenyl group, a pentenyl group, a hexenyl group, and the like, and the vinyl group or the hexenyl group is particularly preferred. These aliphatic unsaturated carbon-carbon bond-containing groups are also preferably bonded to silicon atoms.

The amount of the aliphatic unsaturated carbon-carbon bond-containing groups is preferably 0.001 to 10 mass % of component (A), preferably 0.005 to 5.0 mass %, and more preferably 0.01 to 3.0 mass %. In particular, it is preferable to use an organosiloxane where the amount of the vinyl ($CH_2=CH-$) portion in the aliphatic unsaturated carbon-carbon bond-containing group (hereinafter referred to as the "vinyl content") is in the range of 0.005 to 10.0 mass %, and a range of 0.005 to 5.0 mass % is particularly preferable.

Component (A) may include, as an organic group other than an aliphatic unsaturated carbon-carbon bond-containing group, an alkyl group such as a methyl group, an ethyl group, a propyl group, a butyl group, a pentyl group, a hexyl group, a heptyl group, or the like; an aryl group such as a phenyl group, a tolyl group, a xylyl group, a naphthyl group, or the like; an aralkyl group such as a benzyl group, a phenethyl group, and the like; an aralkyl group such as a phenethyl group; and an alkyl halide group such as a chloromethyl group, a 3-chloropropyl group, and a 3,3,3-trifluoropropyl group. From an industrial perspective, it is particularly preferable to include a methyl group. On the other hand, from the perspective of elongation of the cured product particularly at high temperature, adhesion to the substrate, and transparency, and particularly reducing haze value, a methyl group is preferred as the organic group other than the aliphatic unsaturated carbon-carbon bond-containing group in component (A), and the amount of aryl groups or aralkyl groups is less than 0.1 mol % of the total number of groups bonded to a silicon atom, and particularly 0.0 mol %, and thus the composition preferably does not contain an aryl group or an aralkyl group.

Component (A) may be an individual component or may be a mixture of a plurality of components, but based on the technical effects of the present invention, and in particular from the perspective of elongation of the cured product and adhesion to the substrate, component (A) may be a mixture containing:

(A1) a straight chain or branched chain organopolysiloxane having at least two aliphatic unsaturated carbon-carbon bond-containing groups only at both ends of the molecular chain and a degree of siloxane polymerization in a range of 10 to 1000; or (A2) a straight chain or branched chain organopolysiloxane having at least one or more aliphatic unsaturated carbon-carbon bond-containing groups at locations other than the terminals of the molecular chain and having at least three or more aliphatic unsaturated carbon-carbon bond-containing groups in a molecule, and having a degree of siloxane polymerization in a range of 10 to 1000;

at a mass ratio of 30:70 to 70:30.

Furthermore, component (A1) and component (A2) may also be, and preferably are, mixtures of two or more components that differ in the degree of siloxane polymerization and/or amount of aliphatic unsaturated carbon-carbon bond-containing groups.

Component (A1) forms a structure in which the molecular chain length is extended by a chain length extension reaction with another component in a hydrosilylation reaction, and is a component that improves the elongation and flexibility of the curing reactant (adhesive agent layer) and enhances the adhesion to a substrate. By using a specific amount of component (A1), particularly together with component (A2), which has a low degree of siloxane polymerization, and component (B), which has a high degree of siloxane polymerization, the curing reactant obtained by curing the composition will contain at least a certain amount or more of a structure with an extended molecular chain length, further improving the adhesion properties of the adhesive layer. Furthermore, since the degree of siloxane polymerization of component (A1) is not so large by itself, the overall viscosity of the composition can be reduced, the amount of organic solvent used can be reduced to a minimum, and sufficiently practical coatability can be achieved.

Component (A1) is preferably a straight chain organopolysiloxane expressed by the general formula:

$$R^a{}_3SiO(R^1{}_2SiO_{2/2})_{m1}SiR^a{}_3.$$

However, component (A1) may contain, in part, units selected from a group consisting of branched siloxane units expressed by $R^1SiO_{3/2}$ and branched siloxane units expressed by $SiO_{4/2}$ in an average range of 0 to 5 units per molecule, and thus component (A1) may be a branched chain organopolysiloxane.

In the formula, each $R^1$ is independently exemplified by an organic group other than an aliphatic unsaturated carbon-carbon bond-containing group. In addition, $R^a$ is an aliphatic unsaturated carbon-carbon bond-containing group or $R^1$, and at least two $R^a$ in one molecule are aliphatic unsaturated carbon-carbon bond-containing groups, preferably alkenyl groups, more preferably vinyl groups or hexenyl groups. The degree of siloxane polymerization, which is "m1+2" in the formula, is preferably a number in the range of 10 to 950, more preferably a number in the range of 50 to 925, and particularly preferably a number in the range of 100 to 900. Note that the "+2" is the sum of the siloxane units at both ends of the straight chain molecule and may also include, in the range of 0 to 5 units, units selected from branched siloxane units expressed by $R^1SiO_{3/2}$ and branched siloxane units expressed by $SiO_{4/2}$. Note that for the branched siloxane unit expressed by $R^1SiO_{3/2}$, one $R^1{}_3SiO_{1/2}$ unit is added to the molecule, and for the branched siloxane unit expressed by $SiO_{4/2}$, two $R^1{}_3SiO_{1/2}$ units are added to the molecule to form the molecular chain end corresponding to the branched siloxane unit.

In the above general formula, in the $R^a3SiO_{1/2}$ unit at both ends, at least one $R^a$ is an aliphatic unsaturated carbon-carbon bond-containing group, and the other $R^a$ at both terminals is preferably an alkyl group, and from an industrial perspective, a methyl group is preferable. In addition, component (A1) is preferably substantially an aryl group or aralkyl group.

Component (A2) has a crosslinking reaction point in the side chain portion in a hydrosilylation reaction, and therefore is a component that forms a crosslinked structure between siloxane units, and improves the hardness and adhesion of the curing reactant to the substrate. If a specific amount of component (A2) is used, particularly together with component (A1) having a low degree of siloxane polymerization and component (B) having a high degree of siloxane polymerization, the crosslink density of the curing reactant obtained by curing the composition and the length of the siloxane units between crosslink points in the crosslinked product can be adjusted, and adhesion and removability of the adhesive layer is further improved. Note that the degree of siloxane polymerization of component (A2) is not that large, similar to component (A1), and therefore the overall viscosity of the composition can be reduced, the amount of organic solvent used can be reduced to a minimum, and sufficiently practical coatability can be achieved.

Component (A2) is preferably a straight chain organopolysiloxane expressed by the general formula:

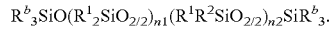

$$R^b{}_3SiO(R^1{}_2SiO_{2/2})_{n1}(R^1R^2SiO_{2/2})_{n2}SiR^b{}_3.$$

However, component (A2) may contain, in part, units selected from a group consisting of branched siloxane units expressed by $R^1SiO_{3/2}$ and branched siloxane units expressed by $SiO_{4/2}$ in an average range of 0 to 5 units per molecule, and thus component (A1) may be a branched chain organopolysiloxane.

In the formula, each $R^1$ is independently an organic group other than an aliphatic unsaturated carbon-carbon bond-containing group, and each $R_2$ is an aliphatic unsaturated carbon-carbon bond-containing group. Furthermore, $R^b$ is $R^1$ or $R^2$, but when n2 is 2 or less, at least one $R^b$ is $R^2$ and there are at least three $R^2$ included in the molecule.

Component (A2) has at least one aliphatic unsaturated carbon-carbon bond-containing group at a location other than the ends of the molecular chain, and n2 is 1 or more. Furthermore, the degree of siloxane polymerization, which is "n1+n2+2" in the formula, is preferably a number in the range of 10 to 900, more preferably a number in the range of 15 to 800, and particularly preferably a number in the range of 15 to 750. Note that the "+2" is the sum of the siloxane units at both ends of the straight chain molecule and may also include, in the range of 0 to 5 units, units selected from branched siloxane units expressed by $R^1SiO_{3/2}$ and branched siloxane units expressed by $SiO_{4/2}$. Note that for the branched siloxane unit expressed by $R^1SiO_{3/2}$, one $R^1{}_3SiO_{1/2}$ unit is added to the molecule, and for the branched siloxane unit expressed by $SiO_{4/2}$, two $R^1{}_3SiO_{1/2}$ units are added to the molecule to form the molecular chain end corresponding to the branched siloxane unit.

In the above general formula, in the $R^a3SiO_{1/2}$ unit at both ends, at least one $R^a$ is an aliphatic unsaturated carbon-carbon bond-containing group, and the other $R^a$ at both terminals is preferably an alkyl group, and from an industrial perspective, a methyl group is preferable. In addition, component (A1) is preferably substantially an aryl group or aralkyl group.

As described above, component (A2) is a component that has crosslinking reactive groups on the siloxane side chain and imparts the cured product with appropriate hardness, but with the present invention, if the length of the siloxane molecule between crosslinking points derived from component (A2), or in other words, the degree of siloxane polymerization between crosslinking points, is between 30 and 200, the adhesion of the curing reactant to the substrate will be improved.

Specifically, component (A2) suitably has an average number of siloxane units between two aliphatic unsaturated carbon-carbon bond-containing groups in a range of 30 to 200, or a range of 40 to 170. In particular, component (A2) may be and preferably is a mixture of two or more types of organopolysiloxane without an aliphatic unsaturated carbon-carbon bond-containing group at the terminals of the molecular chain but differing in the degree of siloxane polymerization and/or the amount of aliphatic unsaturated carbon-carbon bond-containing groups/average number of siloxane units between two aliphatic unsaturated carbon-carbon bond-containing groups. Note that the average number of siloxane units between two aliphatic unsaturated carbon-carbon bond-containing groups in component (A2) can be calculated by dividing the total number of siloxane units by the number of siloxane units having an aliphatic unsaturated carbon-carbon bond-containing group such as vinyl groups or the like, in the case of straight chain polysiloxane.

Particularly preferably, component (A2) is a straight chain organopolysiloxane or a mixture thereof, wherein the terminal of the molecular chain is blocked with a siloxane unit without an aliphatic unsaturated carbon-carbon bond-containing group such as a trimethylsiloxy group and three or more aliphatic unsaturated carbon-carbon bond-containing groups are included in the siloxane side chain. Preferably, the average number of siloxane units between two aliphatic unsaturated carbon-carbon bond-containing groups in the siloxane side chain is in a range of 30 to 200, more preferably in a range of 40 to 170. Note that when component (A2) is a mixture of two straight chain organopolysiloxanes, the average number of siloxane units between two aliphatic unsaturated carbon-carbon bond-containing groups in the siloxane side chain is in a range from 30 to 200, more suitably from 40 to 170, in the overall mixture, or in each independent organopolysiloxane that composes the mixture.

The properties of component (A) at room temperature are oil-like, and the viscosity of component (A) is preferably 10 mPa·s or more at 25° C. In particular, from the perspective of the coatability of the curable silicone composition according to the present invention, it is preferable that the viscosity of component (A) is 1 mPa·s or more and 10,000 mPa·s or less.

Note that volatile or low molecular weight siloxane oligomers (octamethyltetrasiloxane (D4), decamethylpentasiloxane (D5)), and the like are preferably reduced or removed from component (A), from the perspective of preventing contact failure. While the amount can be designed as desired, the amount may be less than 1% by mass of all of component (A), less than 0.1% by mass of siloxane oligomers, or may be reduced to a level near the detection limit, as required.

[Component (B)]

Component (B) is a straight chain or branched chain organopolysiloxane having at least two aliphatic unsaturated carbon-carbon bond-containing groups in a molecule and a degree of siloxane polymerization within a range of 1001 or more and 10,000. Component (B) is a curable reactive component similar to component (A), but has a higher degree of polymerization and viscosity than component (A); therefore, by using a certain amount of both components together, the overall viscosity of the curable silicone composition can be adjusted to improve the coatability and the strength of the cured product.

Preferably, component (B) is a straight chain organopolysiloxane expressed by the general formula:

[Formula 1]

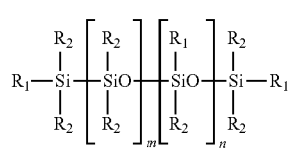

However, component (B) may contain 0 to 5 branched siloxane units as expressed by $R^1SiO_{3/2}$ or $SiO_{4/2}$ as a portion, and may be a branched chain organopolysiloxane.

In the formula, each $R^1$ is independently exemplified by an organic group such as an aliphatic unsaturated carbon-carbon bond-containing group, alkyl group, or the like. In addition, $R^a$ is an organic group without an aliphatic unsaturated carbon-carbon bond-containing group or is $R^1$, and at least two $R^1$ in one molecule are aliphatic unsaturated carbon-carbon bond-containing groups, preferably alkenyl groups, more preferably vinyl groups or hexenyl groups. The degree of siloxane polymerization, which is "m+n" in the formula, is preferably in a range of 1001 to 10,000, more preferably in the range of 2000 to 10,000, and particularly preferably in the range of 2000 to 8000. In addition, component (B) may contain from 0 to 5 branched siloxane units expressed by $R^1SiO_{3/2}$ or $SiO_{4/2}$. Note that for the branched siloxane unit expressed by $R^1SiO_{3/2}$, one $R^1_3SiO_{1/2}$ unit is added to the molecule, and for the branched siloxane unit expressed by $SiO_{4/2}$, two $R^1_3SiO_{1/2}$ units are added to the molecule to form the molecular chain end corresponding to the branched siloxane unit.

In the general formula above, $R^2$ is an organic group without an aliphatic unsaturated carbon-carbon bond-containing group, preferably an alkyl group, and from an industrial perspective, a methyl group is particularly preferred. On the other hand, from the perspective of elongation of the cured product particularly at high temperature, adhesion to the substrate, and transparency, and particularly reducing haze value, a methyl group is preferred as the organic group other than the aliphatic unsaturated carbon-carbon bond-containing group in component (B), and the amount of aryl groups or aralkyl groups is less than 0.1 mol % of the total number of groups bonded to a silicon atom, and particularly 0.0 mol %, and thus the composition preferably does not contain an aryl group or an aralkyl group.

Component (B) is preferably in a highly viscous liquid or gum-like state at room temperature. Specifically, component (B) may be and preferably is raw rubber-like, having a viscosity at 25° C. of 1,000,000 mPa·s or more, or a plasticity measured in accordance with the method specified in JIS K6249 (the thickness of a spherical sample of 4.2 g at 25° C. when a load of 1 kgf is applied for 3 minutes is read to 1/100 mm, and this value is multiplied by 100) in the range of 50 to 200, more preferably in the range of 80 to 180.

Note that in order to prevent contact failure and the like, these alkenyl group-containing organopolysiloxanes preferably have volatile or low molecular weight siloxane oligomers (octamethyltetrasiloxane (D4), decamethylpentasiloxane (D5) and the like) reduced or eliminated. While the amount can be designed as desired, the amount may be less than 1% by mass of all of component (A), less than 0.1% by mass of siloxane oligomers, or may be reduced to a level near the detection limit, as required.

Component (B) is a component for adjusting the viscosity of the curable silicone composition of the present invention, improving the coatability, adjusting the strength and hardness of the cured product made by curing the composition, and imparting adhesion. Therefore, the amount of component (B) is preferably in the range of 1 to 100 mass parts when the mass of component (A) in the composition is 100 mass parts, but 2.5 to 40 mass parts is more preferable, and 3.0 to 30 mass parts is particularly preferable. If the amount of component (B) is less than the lower limit mentioned above, the viscosity of the composition according to the present invention may be low and the adhesive strength may be insufficient. On the other hand, if the amount of component (B) exceeds the upper limit mentioned above, the curable silicone composition of the present invention has excessively high viscosity and may be unsuitable for the aforementioned applications.

When the total amount (=sum) of components (A) to (D) that form the solid content of the curable silicone composition of the present invention when cured, including components (C) and (D) described below, is 100 mass parts, the total amount of components (A) and (B) is preferably in a range of 65 to 99 mass parts.

[Component (C)]

Component (C) is an organopolysiloxane resin and is a component that optionally adjusts the adhesive strength to the substrate. Depending on the amount of component (C) used, it is possible to adjust the hardness of the cured product of the composition and the adhesion to the substrate. Specifically, if the amount of component (C) is 0 or a small amount, the cured product will be flexible and have low adhesion to the substrate surface, and can easily be removed from the substrate surface by interfacial peeling, even when the cured product is exposed to high temperatures. On the other hand, as the amount of component (C) increases, the adhesion of the cured product to the substrate surface tends to increase. If more than 100 mass parts of component (C) are used for 100 mass parts of component (A), the flexibility of the cured product obtained will be impaired, a strong bond will be formed to the substrate surface, and removal from the substrate surface may become difficult, particularly after exposure to high temperature.

Component (C) is an organopolysiloxane resin containing in a molecule (a) a siloxane unit (M unit) as expressed by $R^3SiO_{1/2}$ (where R mutually independently represent a monovalent organic group) and (b) a siloxane unit (Q unit) as expressed by $SiO_{4/2}$. The molar ratio of M units to Q units is preferably 0.5 to 2.0. This is because when the molar ratio is less than 0.5, adhesion to the substrate of the cured product may be reduced, whereas when the molar ratio is greater than 2.0, the cohesive strength of material forming the adhesive layer decreases.

In particular, the molar ratio of (a) M units to (b) Q units is preferably within a range of M units:Q units=0.50:1.00 to 1.50:1.00, more preferably within a range of 0.55:1.00 to 1.20:1.00, and even more preferably within a range of 0.60:1.00 to 1.10:1.00. The molar ratio can be easily measured by $^{29}Si$ nuclear magnetic resonance.

Component (C) is preferably an organopolysiloxane resin as expressed by general unit formula: $(R^3SiO_{1/2})_a(SiO_{4/2})_b$ (where R mutually independently represents a monovalent organic group, a and b are positive numbers, respectively, and a+b=1 and a/b=0.5 to 1.5).

Component (C) may be configured from only M units (a) and Q units (b), but may also contain $R^2SiO_{2/2}$ units (D units) and/or $RSiO_{3/2}$ units (T units). Note that in the formula, R mutually independently represents a monovalent organic group. The total amount of (a) M units and (b) Q units in component (C) is preferably 50 weight % or more, more preferably 80 weight % or more, and particularly preferably 100 weight %.

Although the monovalent organic group is not particularly limited, in relation to component (D), it is preferably an aliphatic unsaturated carbon-carbon bond non-containing group.

Aliphatic unsaturated carbon-carbon bond non-containing groups include monosaturated hydrocarbon groups and oxygen atom-containing monosaturated hydrocarbon groups.

A preferable monosaturated hydrocarbon group is, for example, a substituted or unsubstituted, monosaturated hydrocarbon group having 2 to 12 carbon atoms, preferably 2 to 8 carbon atoms, and more preferably having from 2 to 6 carbon atoms.

Examples of unsubstituted monosaturated hydrocarbon groups having 1 to 12 carbon atoms include: methyl groups, ethyl groups, propyl groups, pentyl groups, hexyl group, octyl groups, and other alkyl groups; cyclohexyl groups, cycloheptyl groups, and other cycloalkyl groups; phenyl groups, tolyl groups, xylyl groups, and other aryl groups; benzyl groups, α-methylstyril groups, 2-phenylethyl groups, and other aralkyl groups. Examples of substituted monosaturated hydrocarbon groups having 1 to 12 carbon atoms include those in which a portion of hydrogen atoms of the monounsaturated hydrocarbon groups are substituted by a halogen atom (fluorine, chlorine, bromine or iodine) or the like.

Specific examples include: fluorinated monosaturated hydrocarbon groups, such as 3,3,3-trifluoropropyl groups, 4,4,5,5,5-pentafluorobutyl groups, 3,3,4,4,5,5,6,6,6-nonafluorohexyl groups, and other perfluoroalkyl groups; and chlorinated monosaturated hydrocarbon groups, such as 3-chloropropyl groups and other chloroalkyl groups, and dichlorophenyl groups and other chlorophenyl groups.

The monosaturated hydrocarbon group is preferably a substituted or unsubstituted alkyl group having 1 to 12 carbon atoms. Methyl groups are preferable as the substituted or unsubstituted alkyl groups having 1 to 12 carbon atoms. Note that from the perspective of reducing the haze value of the cured product, a methyl group is suitable as a monovalent organic group in component (C), and the amount of aryl or aralkyl groups is preferably 0.1 mol % based on the total amount of groups bonded to a silicon atom, but having substantially no aryl or aralkyl groups, or 0.0 mol %, is particularly preferable.

An oxygen atom-containing monosaturated hydrocarbon group includes, for example, a substituted or unsubstituted oxygen atom-containing monosaturated hydrocarbon group having 2 to 12 carbon atoms.

Examples of substituted or unsubstituted monosaturated hydrocarbon group containing an oxygen atom, having 1 to 12 carbon atoms include alkoxy groups having 1 to 12 carbon atoms and the like.

Examples of alkoxy groups having 1 to 12 carbon atoms include methoxy groups, ethoxy groups, propoxy groups, butoxy groups, isopropoxy groups, and the like.

[Reduction of Hydroxyl Groups or Hydrolyzable Groups]

Hydrolyzable groups such as a hydroxyl group or alkoxy group in component (C) are directly bonded to silicon atoms such as T units or Q units among the siloxane units in the resin structure, and are groups derived from the silane used as a raw material or generated as a result of hydrolysis of the silane. The content of hydroxyl groups or hydrolyzable groups can be reduced by hydrolyzing the synthesized organopolysiloxane resin with a silylating agent such as trimethylsilane. This can suppress the formation of an organopolysiloxane resin structure with a large molecular weight in the cured product, further improve the curability of the composition at low temperatures, and enhance the storage elastic modulus of the cured product layer obtained, and in some cases may improve adhesion to the substrate and improve the removability from the surface of the substrate after exposure to high temperatures.

In the present invention, component (C) is an organopolysiloxane resin expressed by the general unit formula: $(R^3SiO_{1/2})_a(SiO_{4/2})_b$ (where R represents a mutually independent monosaturated organic group, and a and b are positive numbers, respectively, where a+b=1 and a/b=0.5 to 1.5). It is preferable that 90 mol % or more of R is an alkyl group or a phenyl group having 1 to 6 carbon atoms, and it is particularly preferable that 95 to 100 mol % of R is a methyl group or a phenyl group, and most preferable that the content of a hydroxyl group or a hydrolyzable group in component (C) is a resin (also called a MQ resin) in the range of 0 to 7 mol % of total silicon (0.0 to 1.50 mass % as a hydroxyl group).

Examples of component (C) include:

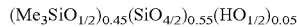

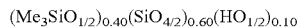

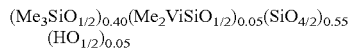

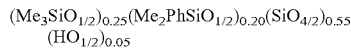

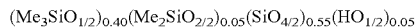

$(Me_3SiO_{1/2})_{0.40}(MeSiO_{3/2})_{0.05}(SiO_{4/2})_{0.55}(HO_{1/2})_{0.05}$

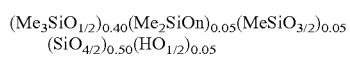

(Me: methyl group, Ph: phenyl group, MeO: methoxy group, HO: silicon atom bonded hydroxyl group. Note that in order to express the relative amount of hydroxyl groups to silicon atoms, the total amount of the subscripts of units containing a silicon atom is set to 1, and the subscript of the $(HO)_{1/2}$ unit indicates the relative amount.) Note that from the perspective of preventing contact failure, the low molecular weight siloxane oligomer in component (C) may be reduced or removed.

With the present invention, particularly from the perspective of improving curability at low temperature, and the storage elastic modulus and haze value of the cured product, component (C) preferably has low molecular weight, and high molecular weight components (components that easily aggregate into a gel-like state, tend to increase the haze value, and reduce low temperature curability) are preferably removed in advance. Specifically, a suitable component (C) of the present invention is an organopolysiloxane resin having a mass average molecular weight in the range of 1,000 to 10,000, and for example, the amount of organopolysiloxane resin having a molecular weight of 100,000 or more is 1 mass % or less of the total, more suitably 0.5 mass % or less, and particularly preferably substantially 0 mass %. If component (C) is a component with low molecular weight and reduced hydroxyl groups or hydrolyzable groups as described above, the presence or by-production of high molecular weight organopolysiloxane resins in the cured product can be suppressed, resulting in transparency and a low haze value. Furthermore, high molecular weight organic polysiloxane resin will not be generated in the system in conjunction with side reactions even if exposed to high temperatures and long curing times, in particular, and therefore changes in the storage elastic modulus can be suppressed, resulting in a curable silicone composition with greatly improved adhesion and removability of the cured product from the substrate.

Component (C) is a component for providing adhesion to the desired substrate and adjusting the storage elastic modulus of the cured product obtained by curing the curable silicone composition of the present invention; therefore, the amount of components (C) is within a range of 0 to 100 mass parts based on the mass of component (A) of the composition being 100 mass parts. If the amount is too small (including if the amount is 0 mass parts), the cured product will have relatively inferior adhesive strength to the substrate, and the adhesion will not change even when exposed to high temperature, and the cured product can be easily removed from the substrate surface. On the other hand, if the added amount of component (C) exceeds the upper limit, the silicone curable composition of the present invention will be too hard and may be particularly unsuitable for the aforementioned application.

When the total amount (=sum) of components (A) to (D) that form the solid content of the curable silicone composition of the present invention when cured is 100 mass parts, the total amount of component (C) is preferably in a range of 0 to 40 mass parts.

[Component (D)]

Component (D) is an organohydrogen polysiloxane having two or more silicon bonded hydrogen atoms in one molecule, which functions as a crosslinking agent in a hydrosilylation reaction with component (A)/component (B) and adjusts the hardness of the cured product based on the added amount thereof. By using component (D) within a certain quantitative range with regard to components (A) and (B), the curing reactivity of the entire composition can be improved to achieve favorable curing properties and suitable hardness (crosslink density), and the adhesive strength of the cured product and removability after use can be designed to be in a favorable practical range.

Component (D) may be at least one type selected from cyclic organohydrogen polysiloxanes having at least three silicon bonded hydrogen atoms in the molecule, and straight chain or branched chain organohydrogen polysiloxanes having at least two or more silicon bonded hydrogen atoms in the molecule. Component (D) may be a mixture of two or more of the above-mentioned organohydrogen polysiloxanes.

Examples of cyclic organohydrogen polysiloxanes include those expressed by the following formulas:

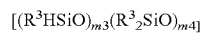

In the formula, the value of m3+m4 is within a range of 3 to 20, m3 is a value of 3 or higher, and m4 is a value of 0 or higher. $R^3$ is a monovalent hydrocarbon group having 1 to 10 carbon atoms, excluding alkenyl groups, and examples include the same groups as $R^2$, suitably methyl or phenyl groups.

The straight chain or branched chain organohydrogen polysiloxane having at least two or more silicon bonded hydrogen atoms in the molecule is an organohydrogen polysiloxane such as a polyorganohydrogen siloxane or a copolymer of organohydrogenpolysiloxane and diorganosiloxane, having at least two or more silicon bonded hydrogen atoms in the side chain portion and having the terminals of the molecular chain blocked with a trialkylsiloxy group, aryl dialkylsiloxy group, and the like. The degree of siloxane polymerization ranges from 5 to 500, preferably from 5 to 200.

Examples of such component (D) include 1,3,5,7-tetramethyl cyclotetrasiloxane, tris(dimethylhydrogensiloxy) methylsilane, tris(dimethylhydrogensiloxy) phenylsilane, 1-(3-glycidoxypropyl)-1,3,5,7-tetramethyl cyclotetrasiloxane, 1,5-di(3-glycidoxypropyl)-1,3,5,7-tetramethyl cyclotetrasiloxane, 1-(3-glycidoxypropyl)-5-trimethoxysilylethyl-1,3,5,7-tetramethyl cyclotetrasiloxane, methylhydrogenpolysiloxanes blocked at both ends of a molecular chain with trimethylsiloxy groups, dimethylsiloxane-methylhydrogensiloxane copolymers blocked at both ends of a molecular chain with trimethylsiloxy groups, dimethylpolysiloxane blocked at both ends of a molecular chain with dimethylhydrogensiloxy groups, methylhydrogensiloxane-diphenylsiloxane copolymers blocked at both ends of a molecular chain with trimethylsiloxy groups, methylhydrogensiloxane-diphenylsiloxane-dimethylsiloxane copolymers blocked at both ends of a molecular chain with trimethylsiloxy groups, methyl tris(dimethylsiloxy) silane, tetrakis(dimethylsiloxysilane), methylhydrogenpolysiloxane blocked at both ends of a molecular chain with trimethylsiloxy groups, methylhydrogensiloxane-dimethylsiloxane copolymers blocked at both ends of a molecular chain with trimethylsiloxy groups, methylhydrogensiloxane-methylphenylsiloxane copolymers blocked at both ends of a molecular chain with trimethylsiloxy groups, and the like.

[SiH/Vi ratio in Component (A)/Component (B) and Component (D)]

The number of moles of silicon bonded hydrogen atoms in components (A), (B), and (D) and the number of moles of aliphatic unsaturated carbon-carbon bonds such as alkenyl groups in components (A) and (B) in the overall composition of the present invention are preferably in a range of 0.1 to 40, more preferably in a range of 0.5 to 30, and particularly preferably in a range of 1.0 to 30. Within this range, the overall crosslink density can be appropriately adjusted, and the desired properties for storage elastic modulus and adhesion of the cured product can be achieved.

On the other hand, if the SiH/Vi ratio is less than the lower limit, adhesive residue or the like may occur when the cured product is adhered to the substrate. If the ratio exceeds the upper limit, unreacted SiH groups may become excessive, resulting in unstable adhesion properties of the cured product.

When the total amount (=sum) of components (A) to (D) that form the solid content of the curable silicone composition of the present invention when cured is 100 mass parts, the total amount of component (D) is preferably in a range of 0.01 to 15 mass parts.

[Component (E)]

The curable silicone composition according to the present invention includes a hydrosilylation reaction catalyst as the component (E). Examples of hydrosilylation reaction catalysts include platinum-based catalysts, rhodium-based catalysts, and palladium-based catalysts, with platinum-based catalysts being preferable in that they markedly accelerate the curing of the present composition. Examples of this platinum based catalyst include platinum fine powder, chloroplatinic acid, an alcohol solution of chloroplatinic acid, a platinum-alkenyl siloxane complex, a platinum-olefin complex, and a platinum-carbonyl complex, with a platinum-alkenyl siloxane complex particularly preferable. Examples of this alkenyl siloxane include 1,3-divinyl-1,1,3,3-tetramethyldisiloxane, 1,3,5,7-tetramethyl-1,3,5,7-tetravinylcyclotetrasiloxane, alkenyl siloxanes in which some of the methyl groups of these alkenyl siloxanes are substituted with groups selected from a group consisting of nitriles, amides, dioxolanes, and sulfolanes, ethyl groups, phenyl groups, or the like, and alkenyl siloxanes in which the vinyl groups of these alkenyl siloxanes are substituted with allyl groups, hexenyl groups, or the like. In particular, 1,3-divinyl-1,1,3,3-tetramethyldisiloxane is preferably used because of the favorable stability of this platinum-alkenylsiloxane complex, and is preferably added in the form of an alkenylsiloxane solution. In addition, from the perspective of improving handling workability and pot life of the composition, these hydrosilylation reaction catalysts may be thermoplastic resin microparticles containing a hydrosilylation reaction catalyst, which are catalysts dispersed or encapsulated in a thermoplastic resin such as a silicone resin, a polycarbonate resin, an acrylic resin, or the like, and particularly may be a thermoplastic resin microparticles containing a hydrosilylation reaction catalyst that contains platinum. Note that as the catalyst for promoting the hydrosilylation reaction, a non-platinum based metal catalyst such as iron, ruthenium, iron/cobalt, or the like may be used.

Note that the thermoplastic resin microparticles containing a platinum-containing hydrosilylation reaction catalyst that can be used in the present invention may be either microparticles in which a hydrosilylation reaction catalyst such as a platinum-based catalyst is dissolved or dispersed in a thermoplastic resin, or microparticles having a structure in which a hydrosilylation reaction catalyst such as a platinum-based catalyst is contained as a core in a thermoplastic resin shell. The thermoplastic resin used as the wall material preferably has a glass transition temperature (Tg) of 75° C. or higher, more preferably 80° C. or higher, and particularly preferably in a range of 80 to less than 250° C. These thermoplastic resins may be used individually or as a combination of a plurality of resins. Furthermore, the average particle size of the thermoplastic resin microparticles containing the catalyst for hydrosilylation reactions is not limited, but is preferably in a range of 0.1 to 500 μm, and more preferably in a range of 0.3 to 100 μm.

While the amount of the hydrosilylation reaction catalyst is not particularly limited in the present invention, the amount of the platinum-based metal with regard to the total amount of solid content in the composition is within a range of 0.1 to 200 ppm, and may be within a range of 0.1 to 150 ppm, within a range of 0.1 to 100 ppm, or within a range of 0.1 to 50 ppm. Herein, the platinum-based metal is a metal element of group VIII including platinum, rhodium, palladium, ruthenium, and iridium. However, in practical use, the amount of the platinum-metal excluding the ligands of the hydrosilylation reaction catalyst is preferably within the range described above. Note that the solid content is a component that forms the cured layer (primarily a main agent, an adhesion-imparting component, a crosslinking agent, a catalyst, and other non-volatile components) when the curable silicone composition according to the present invention is subjected to a curing reaction, and does not include volatile components such as solvents that volatilize at the time of heat curing.

When the amount of the platinum-based metal in the curable silicone composition according to the present invention is 50 ppm or less (45 ppm or less, 35 ppm or less, 30 ppm or less, 25 ppm or less, or 20 ppm or less), discoloration or coloration of the transparent adhesive layer may be suppressed, particularly after curing or when heated or exposed to high-energy rays such as UV rays or the like. Meanwhile, from the perspective of the curability of the organopolysiloxane composition, the content of the platinum-based metal is no lower than 0.1 ppm, because when the content is lower than this lower limit, this may cause curing defects.

The curable silicone composition of the present invention may optionally contain a curing retarder. A curing retarder is added to inhibit a crosslinking reaction between the aliphatic unsaturated carbon-carbon bond-containing groups and the silicon bonded hydrogen atoms in the composition, to extend usable time at ambient temperature, and to improve storage stability. Therefore, from a practical perspective, a curing retarder is a near-essential component for the curable silicone composition of the present invention.

Specifically, examples of the curing retarder include acetylenic compounds, ene-yne compounds, organic nitrogen compounds, organic phosphorus compounds, oxime compounds, and phosphorus compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; ene-yne compounds such as 3-methyl-3-pentene-1-yne, 3,5-dimethyl-1-hexyne-3-yne, and the like; methylalkenylcyclosiloxanes such as 2-ethynyl-4-methyl-2-pentene, 1,3,5,7-tetramethyl-1,3,5,7-tetravinylcyclotetrasiloxane, 1,3,5,7-tetramethyl-1,3,5,7-tetrahexenylcyclotetrasiloxane, and the like, as well as benzotriazoles.

The phosphorus-containing hydrosilylation reaction retarder may be at least one selected from a group consisting of phosphine compounds, phosphoric acid compounds, phosphonic acid compounds, phosphine oxide compounds, phosphite compounds, and phosphonic acid compounds. Examples include components described in Japanese Unexamined Patent Application 2007-308542, such as 1,3-bis(diphenylphosphino)propane and the like.

From the perspective of the curing behavior of the composition, the curable silicone composition of the present invention preferably has an increase in viscosity within 1.5 times after 8 hours at room temperature after preparation of the composition, and should be curable at 80 to 200° C. Suppressed thickening is important from the perspective of handling workability, pot life, and post-curing properties, because curing at a high temperature (80 to 200° C.) above a certain level ensures curability. Note that such a composition can be achieved by selecting a suitable combination and compounded amounts of each of the components described above, the hydrosilylation catalyst, and the curing retarder.

[(F) Organic Solvent and Low-Solvent/Solvent-Free Composition]

The curable silicone composition according to the present invention has relatively low viscosity; therefore, a low solvent or solvent-free composition, including compositions with a small amount or practically no organic solvent component (F), can achieve sufficient coatability for practical use. Specifically, the amount of organic solvent is less than 0 to 60 mass %, particularly preferably less than 50%, and substantially in a range of 0 to 30%, based on the total mass of the composition of 100 mass parts. On the other hand, a small amount of organic solvent may be included if unavoidably included in order to improve the wettability of the composition to the substrate, or as a solvent associated with component (B). The type and amount of organic solvent should be adjusted in consideration of coating workability, and the like. However, from the perspective of designing a solvent-free composition, it is preferable to use as little organic solvent as possible.

More specifically, when the total amount (=sum) of components (A) to (D) that form the solid content of the curable silicone composition of the present invention when cured is 100 mass parts, the total amount of component (F), a diluent, is preferably in a range of 0 to 25 mass parts.

Examples of the organic solvent (F) of the present invention include: aromatic hydrocarbon-based solvents such as toluene, xylene, and benzene; aliphatic hydrocarbon-based solvents such as heptane, hexane, octane, and isoparaffin; ester-based solvents such as ethyl acetate and isobutyl acetate; ether-based solvents such as diisopropyl ether and 1,4-dioxane; chlorinated aliphatic hydrocarbon-based solvents such as trichloroethylene, perchloroethylene, and methylene chloride; and solvent volatile oils, with two or more types capable of being combined in accordance with the wettability of the sheet-like substrate or the like.

The curable silicone composition according to the present invention may optionally contain components other than the components described above to the extent that the technical effects of the present invention are not impaired. For example, the composition may contain: an adhesion promoter; a non-reactive organopolysiloxane such as a polydimethylsiloxane or a polydimethyldiphenylsiloxane; an antioxidant such as a phenol-type, a quinone-type, an amine-type, a phosphorus-type, a phosphite-type, a sulfur-type, or a thioether-type antioxidant; a light stabilizer such as triazoles or benzophenones; a flame retardant such as a phosphate ester-type, a halogen-type, a phosphorus-type, or an antimony-type flame retardant; and one or more types of antistatic agents consisting of a cationic surfactant, an anionic surfactant, a non-ionic surfactant, or the like. Note that, in addition to these components, pigments, dyes, inorganic microparticles (reinforcing fillers, dielectric fillers, conductive fillers, thermally conductive fillers), etc. can be optionally blended.

[(A') Chain Organopolysiloxane which does not Contain a Carbon-Carbon Double Bond-Containing Reactive Group in the Molecule]

The curable silicone composition according to the present invention can blend a non-reactive organopolysiloxane such as a polydimethylsiloxane, polydimethyldiphenylsiloxane, or the like that does not contain a carbon-carbon double bond-containing reactive group such as an alkenyl group, acryl group, methacryl group, or the like. As a result, it may be possible to improve the loss coefficient (tan δ), storage elastic modulus (G'), and loss elastic modulus (G") of the cured product layer. For example, the loss coefficient of the cured product layer can be increased by using a polydimethylsiloxane or polydimethyldiphenylsiloxane having a hydroxyl group terminal, with such compositions included within the scope of the present invention.

[Viscosity of the Entire Composition]

The curable silicone composition of the present invention preferably has a viscosity of 1,000 to 300,000 mPa-s for the entire composition at 25° C., and preferably a range of 5,000 to 50,000 mPa-s for the entire composition. In particular, when the amount of organic solvent is 30 mass % or less with regard to 100 mass parts of the composition, the viscosity of the entire composition is preferably in a range of 5000 to 300,000 mPa-s.

The method of preparing the curable silicone composition according to the present invention is not particularly limited and is performed by homogeneously mixing the components. A small amount of an organic solvent may be added as necessary, and the composition may be prepared by mixing at a temperature of from 0 to 200° C. using a commonly known stirrer or kneader.

The curable silicone composition of the present invention forms a coating film when applied to a substrate and forms a cured product by heating under temperature conditions of from 80 to 200° C. and preferably under temperature conditions of from 90 to 190° C. Examples of application methods include gravure coating, offset coating, offset gravure, roll coating, reverse roll coating, air knife coating, curtain coating, and comma coating.

The curable silicone composition according to the present invention may optionally contain components other than the components described above to the extent that the technical effects of the present invention are not impaired. For example, the composition may contain: an adhesion promoter; a non-reactive organopolysiloxane such as a polydimethylsiloxane or a polydimethyldiphenylsiloxane; an antioxidant such as a phenol-type, a quinone-type, an amine-type, a phosphorus-type, a phosphite-type, a sulfur-type, or a thioether-type antioxidant; a light stabilizer such as triazoles or benzophenones; a flame retardant such as a phosphate ester-type, a halogen-type, a phosphorus-type, or an antimony-type flame retardant; and one or more types of antistatic agents consisting of a cationic surfactant, an anionic surfactant, a non-ionic surfactant, or the like. Note that, in addition to these components, pigments, dyes, inorganic microparticles (reinforcing fillers, dielectric fillers, conductive fillers, thermally conductive fillers), etc. can be optionally blended.

[(A') Chain Organopolysiloxane which does not Contain a Carbon-Carbon Double Bond-Containing Reactive Group in the Molecule]

The curable silicone composition according to the present invention can blend a non-reactive organopolysiloxane such as a polydimethylsiloxane, polydimethyldiphenylsiloxane, or the like that does not contain a carbon-carbon double bond-containing reactive group such as an alkenyl group, acryl group, methacryl group, or the like. As a result, it may be possible to improve the loss coefficient (tan $\delta$), storage elastic modulus (G'), and loss elastic modulus (G") of the adhesive layer made by curing the curable silicone composition of the present invention. For example, the loss coefficient of the adhesive layer can be increased using a polydimethylsiloxane or polydimethyldiphenylsiloxane having a hydroxyl group terminal, with such compositions included within the scope of the present invention.

The method of preparing the curable silicone composition according to the present invention is not particularly limited and is performed by homogeneously mixing the components. A solvent may be added as necessary and the composition may be prepared by mixing at a temperature of from 0 to 200° C. using a known stirrer or kneader.

The organopolysiloxane composition of the present invention forms a coating film when applied to a substrate and forms a cured product by heating under temperature conditions of from 80 to 200° C. and preferably under temperature conditions of from 90 to 190° C. Examples of application methods include gravure coating, offset coating, offset gravure, roll coating, reverse roll coating, air knife coating, curtain coating, and comma coating.

[Adhesion of the Cured Product]

The curable silicone composition of the present invention is characterized in that the cured layer formed by curing the composition by a hydrosilylation reaction demonstrates adhesion. The adhesive layer of the present invention has the abovementioned configuration and expresses sufficient adhesive strength for practical use; therefore, a known silicone pressure sensitive adhesive or the like can be substituted and used as desired.

Specifically, an adhesive layer can be designed to have an adhesive strength in a range of 100 to 2500 gf/inch measured at a tensile speed of 300 mm/min using a 180° peel test method in accordance with JIS Z 0237 relative to an SUS substrate of an adhesive layer having a thickness of 40 µm made by curing the curable silicone composition of the present invention, and an adhesive layer that can be suitably designed in the range of 500 to 2250 gf/inch is suitable. Note that the thickness (40 µm) described above is the thickness of the cured layer itself serving as a reference for objectively defining the adhesion of the cured layer according to the present invention. It goes without saying that the organopolysiloxane composition of the present invention is not limited to a thickness of 40 µm and may be used as a cured layer (cured adhesive layer) of an arbitrary thickness.

[Use as an Adhesive Layer]

The cured product of the present invention can, in particular, be used as an adhesive layer. In addition, in order to improve adhesion with the adherend, surface treatment such as primer treatment, corona treatment, etching treatment, or plasma treatment may be performed on the surface of the adhesive layer or the substrate. However, the adhesive layer of the present invention has excellent adhesion to a substrate of a display device, or the like as described above; therefore, these treatments may be added, as required, to further improve adhesion with the adherend, or these treatments may be omitted to achieve higher production efficiency.

The curable silicone composition according to the present invention is cured by applying the composition to a release liner, then heating under the temperature conditions described above, and after the release liner is peeled off and the composition is attached to a film-like substrate, a tape-like substrate, or a sheet-like substrate (hereinafter, referred to as a "film-like substrate") or applied to a film-like substrate, curing by heating at the temperature conditions described above can be performed to form a cured adhesive layer on the surface of the substrate. A laminate, provided with a cured layer, in particular, a film-like cured layer, obtained by curing the organopolysiloxane composition according to the present invention on a film-like substrate, may be used as adhesive tape, detachable protective film, adhesive bandage, low temperature support, transfer film, label, emblem, and decorative or explanatory sign. Further, a cured layer obtained by curing the organopolysiloxane composition according to the present invention may be used to assemble automobile parts, toys, electronic circuits, or keyboards. Alternatively, a cured layer formed by curing the organopolysiloxane composition according to the present invention, particularly a film-like adhesive layer, may be used in the production, construction, and use of a laminated touch screen or flat panel display.

Exemplary types of substrates include paperboard, cardboard paper, clay-coated papers, polyolefin laminate papers, particularly polyethylene laminate papers, synthetic resin films and sheets, natural fiber woven materials, synthetic fiber woven materials, artificial leather materials, and metal foils. In particular, synthetic resin films and sheets are preferable, with exemplary synthetic resins including: polyimides, polyethylenes, polypropylenes, polystyrenes, polyvinyl chlorides, polyvinylidene chlorides, polycarbonates, polyethylene terephthalates, cyclopolyolefins, and nylons. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. At the same time, for applications such as a display device in which visibility is required, a transparent substrate and specifically a transparent material such as a polypropylene, polystyrene, polyvinylidene chloride, polycarbonate, polyethylene terephthalate, PEN, and the like is preferable.

The substrate is preferably a film-like or sheet-like substrate. The thickness thereof is not particularly limited and can be designed with a desired thickness in accordance with the application. Furthermore, in order to improve the adhesion between a supporting film and cured adhesive layer, a supporting film subjected to a primer treatment, corona treatment, etching treatment, or plasma treatment may be used. Furthermore, the surface of the film-like substrate on the opposite side as the cured layer or cured adhesive layer surface may be subjected to surface treatments such as a treatment for scratch prevention, grime prevention, fingerprint adhesion prevention, anti-glare, anti-reflection, antistatic, or other treatment.

As the application method to the substrate, gravure coating, offset coating, offset gravure, roll coating using an offset transfer roll coater, reverse roll coating, air knife coating, curtain coating using a curtain flow coater or the like, comma coating, Meyer bar, or other known methods used for the purpose of forming a cured layer may be used without limitation.

The coating amount can be designed at a desired thickness in accordance with the application such as a display device; for example, the thickness of the adhesive layer after curing may be from 1 to 1000 μm, from 5 to 900 μm, or from 10 to 800 μm; however, there is no limitation thereto.

The adhesive layer according to the present invention may be a single layer or a multilayer structure obtained by laminating two or more adhesive layers in accordance with the required properties. The multilayered adhesive layer may be made by laminating adhesive films made one layer at a time, or by performing the process of coating and curing the curable silicone composition a plurality of times, such as on a film substrate with a release layer.

The adhesive layer according to the present invention may serve as another functional layer selected from a dielectric layer, conductive layer, heat dissipation layer, insulating layer, reinforcing layer, and the like, in addition to providing bonding or adherence between members. In particular, the curable silicone composition of the present invention is extremely useful for temporarily fixing temporary functional layers or supposedly detachable functional layers, because it forms a cured adhesive layer that can very easily be removed from the substrate surface.

When the cured layer obtained by curing the curable silicone composition of the present invention is an adhesive layer, in particular, an adhesive film, the cured layer is preferably treated as a laminate film that is removably adhered to a film substrate provided with a release layer having a release coating function. The release layer may also be referred to as a release liner, a separator, a release layer, or a release coating layer, and may preferably be a release layer having a release coating function such as a silicone-based release agent, a fluorine-based release agent, an alkyd-based release agent, a fluorosilicone-based release agent, or the like, or may have physically fine irregularities formed on a substrate surface, such that the adhesive layer of the present invention will not easily adhered to the substrate. In particular, the laminated body according to the present invention preferably has a release layer obtained by curing a fluorosilicone release agent as the release layer.

The cured product made by curing the curable silicone composition of the present invention has both adhesion and viscoelasticity as described above, along with excellent properties such as transparency and low haze, and therefore is useful as an elastic adhesive layer, or as a member of various types of electronic and electrical devices. In particular, the cured product is useful as an electronic material, a member for a display device, or a member for a transducer (including sensors, speakers, actuators, and generators), and a suitable application for the cured product is a member of an electronic component or display device. The cured product according to the present invention may be transparent or opaque, and in particular, a film-shaped cured product, particularly a substantially transparent protective film, is suitable as a member of a display panel or display, and is particularly useful in so-called touch panel applications in which a device, particularly an electronic device, can be operated by touching a screen with a fingertip or the like. Note that the cured product layer of the present invention is not required to have transparency, and may be suitable for applications as a film or sheet-like member that is used in sensors, speakers, actuators, and the like that require a certain degree of elasticity or flexibility of the adhesive layer itself.

[Use as an Adhesive Tape]

An article containing a cured layer obtained by curing the curable silicone composition of the present invention can be an adhesive tape, and particularly a supposedly detachable protective tape, and has a sheet-like member made of the aforementioned adhesive layer and a synthetic resin film or sheet, metal foil, woven material, nonwoven material, paper, or other fiber product. The type of adhesive tape is not particularly limited, and includes insulating tapes, heat-resistant tapes, solder masking tapes, mica tape binders, temporary fixing tapes (including in particular temporary fixing tapes for silicone rubber parts, and the like), splicing tapes (including in particular splicing tapes for silicone release paper).

In particular, cured products, particularly cured product layers, made by curing the curable silicone composition of the present invention can achieve high transparency and low total haze values, have sufficient adhesion to the substrate for practical use, have stable adhesion properties and appearance of an adhesive layer even when exposed to high temperatures, and are easily removed from the substrate surface after use. Therefore, they are particularly suitable for functional films that are temporarily used for display devices, semiconductors, and the like, on the premise that they can be attached and detached.

[Laminates and Adhesive Sheets]

A laminate with a cured adhesive layer made by curing the curable silicone composition may be formed on a film substrate, and suitably, these film substrates may be provided with a release layer for the cured adhesive layer.

The laminate body of the present invention preferably has a sheet-like substrate with at least one release layer, and the release layer is preferably in contact with the cured adhesive layer. Therefore, the cured adhesive layer can easily be peeled off from the sheet-like substrate. The release agent contained in the release layer is not particularly limited, and the same release agents as described above may be suggested.

In particular, the laminate body may be able to handle the adhesive layer separated from the film-like substrate alone, or there may be two film-like substrates.

Specifically, the laminate body may have:
a film-like substrate;
a first release layer formed on the film-like substrate;
an adhesive layer formed by applying and curing the curable silicone composition on the release layer; and
a second release layer laminated on the adhesive layer.

Similarly, the laminate body of the above form may be formed, for example, by coating and curing the curable silicone composition described above on one of the release layers formed on the film-like substrate to form an adhesive layer, and then laminating another release layer on the adhesive layer.

Furthermore, a laminate body with this form may be produced, for example, by interposing the curable silicone composition described above between the first film-like substrate and the second film-like substrate, to form a layer to a certain thickness by pressing or rolling while heating, and then curing the composition.

The first sheet substrate may be provided with a first release layer, or the first sheet substrate itself may be provided with releasability. Similarly, the second sheet substrate may be provided with a second release layer, or the second sheet substrate itself may be provided with releasability. When the first sheet substrate and/or the second sheet substrate is provided with a first release layer and/or a second release layer, the cured adhesive layer is preferably in contact with the first release layer and/or the second release layer.

For example, the sheet substrate having releasability includes a sheet substrate made of a material having releasability such as a fluororesin film, or a sheet substrate made of a material having no or low releasability such as a polyolefin film to which a release agent such as silicone or fluoroplastic has been added. On the other hand, the sheet substrate provided with the release layer includes, for example, a polyolefin film coated with a release agent such as silicone or fluororesin.

The aforementioned laminate can be used, for example, by peeling the adhesive layer from the film substrate after applying the cured adhesive layer to the adherend.

The thickness of the adhesive layer (cured adhesive layer) is preferably 5 to 10,000 µm, preferably 10 µm or more or 8,000 µm or less, and particularly preferably 20 µm or more and 5,000 µm or less.

[Member for Display Panel or Display]

The cured product made by curing the curable silicone composition of the present invention can be used for protection, construction, or use in a laminate touch screen or flat-panel display, and the specific method of use can be a commonly known method of use of adhesive layers (for example, silicone PSA, silicone adhesives, and silicone sealing agents), without limitation.

INDUSTRIAL APPLICABILITY

The application of the curable silicone composition of the present invention and a cured product obtained by curing the composition is not limited to those disclosed above, and the film provided with the cured product obtained by curing the composition can be used in various display devices for displaying characters, symbols and images. The surface shape of such a display device may be a curved shape or a bowed shape rather than a flat surface, with examples thereof including curved displays or curved transmission screens used in automobiles (including electric vehicles), aircraft, or the like, in addition to various flat panel displays (FPDs). Furthermore, these display devices may have an additional touch panel function that allows input operations by touching icons, notification displays, or operation buttons for executing functions or programs on the screen or display using a finger. Application thereof is possible as a device for CRT displays, liquid crystal displays, plasma displays, organic EL displays, inorganic EL displays, LED displays, surface electrolytic displays (SEDs), field emitting displays (FEDs), and other display devices, or touch panels using the display devices. Moreover, the cured product obtained by curing the composition has excellent adhesion to a substrate and viscoelastic properties, and can be used as a film-like or sheet-like member, which is a member for transducers such as a membrane for speakers (including a sensor, speaker, actuator, and generator), in addition to also being capable of being used as a sealing layer or adhesive layer used in a secondary battery, fuel cell, or solar cell module.

The cured adhesive layer resulting from curing the curable silicone composition of the present invention is substantially transparent, does not cause problems with inferior curing or reduced curability, and has excellent adhesion to substrates such as various display devices.

Note that the transparent film-like substrate provided with the adhesive layer of the present invention may be used for the purpose of scratch prevention, dirt prevention, fingerprint adhesion prevention, static prevention, glare prevention, peep prevention, and the like of these display surfaces.

EXAMPLES

Examples 1 to 7 and Comparative Examples 1 to 3

Examples of the present invention and comparative examples are described hereinafter. Note that "cured" in each of the examples, comparative examples, and reference examples indicates that each composition has fully cured under the respective curing conditions.

(Preparation of a Curing Reactive Silicone Composition)

Curing reactive silicone compositions shown for each of the examples and comparative examples were prepared using the components shown in Table 1. Note that all percentages in Table 1 refer to percentages by mass.

(Measurement of the Molecular Weight of the Organopolysiloxane Component)

The weight average molecular weight (Mw) and number average molecular weight (Mn) of the organopolysiloxane components such as organopolysiloxane resin were calculated based on standard polystyrene using tetrahydrofuran (THF) as a solvent and using Waters gel permeation chromatography (GPC).

(Film Surface)

Each composition was applied to a PET film (available from Toray Co., Ltd., product name: Lumirror (registered trademark) S10, thickness: 50 µm) such that the thickness after curing was 75 µm, after which it was cured for 2 minutes at 140° C. After leaving it for one day, the sample was cut to a width of 20 mm and the adhesive layer side was attached to an SUS plate (made by Paltech) using a roller to make a test piece. The film surface was observed when peeling off, and compositions where the adhesion layer (cured product) remained on the SUS plate were judged to have adhesive residue, while the compositions where no adhesive layer remained on the SUS plate were evaluated as having "no adhesive residue". The results are shown in Table 1.

(Adhesion and Removability to Glass Surface)

Each composition was applied to a PET film (available from Toray Co., Ltd., product name: Lumirror (registered trademark) S10, thickness: 50 µm) such that the thickness after curing was 75 µm, after which it was cured for 2 minutes at 140° C. After one day of exposure, the sample was cut into 20 mm wide strips, and the adhesive surface was pasted onto a new water surface of a float glass plate using a roller to make a test piece. The test pieces were measured for adhesive strength at a tensile speed of 300 mm/min using a 180° peeling test method in accordance with JIS Z0237 using an Orientec RTC-1210 tensile testing machine (measurement at 25 mm width was converted to units of gf/inch), and test pieces with an adhesive strength of 1 gf/25 mm or higher were deemed to have adhesive strength, and are shown in Table 1 as "Adhesion": ○.

In addition, the previous test piece was kept in an oven at 85° C. for 4 hours with the test piece attached to the glass, and then the adhesive strength was measured at a tensile speed of 300 mm/min using the 180° peeling test method in accordance with JIS Z0237 using an Orientec RTC-1210 tensile testing machine (measurement at 25 mm width was converted to units of gf/inch), and the results were compared with the initial adhesion strength. The samples were evaluated as "○" if adhesion was within a range of 100% to 200%, "Δ" if adhesion was 200% or more and less than 300%, and "x" if adhesion was 300% or more. The results are shown as "Removability" in Table 1.

(Haze Value)

Each composition was applied to a PET film (available from Toray Co., Ltd., product name: Lumirror (registered trademark) #10, thickness: 50 μm. Lumirror #50) such that the thickness after curing was 75 μm, after which it was cured for 2 minutes at 140° C. The cured film was measured with a haze meter and the haze value was evaluated as ○ for samples with a haze value of less than 2.0 and X for samples with a haze value of 2.0 or more.

The materials of the curing reactive organopolysiloxane compositions are shown in Table 1. Note that the viscosity or plasticity of each component was measured at room temperature using the following methods.

[Viscosity]

The viscosity (mPa·s) is a value measured using a rotary viscometer conforming to JIS K7117-1, and the kinematic viscosity (mm$^2$/s) is a value measured with an Ubbelohde viscometer conforming to JIS Z8803).

[Structural Analysis of Each Silicone]

The various types of silicone used in the examples were structurally determined by measuring $^{29}$Si on a Bruker 500 MHz NMR.

The following silicone components and others were used for each component in the table. The silicone resin for component C was used by pre-mixing with the other component A and component B, and distilling off the xylene under reduced pressure.

(Component A1)

Alkenyl group-containing polysiloxane expressed by the following formula (vinyl group content: 0.089 mass %)

[Formula 2]

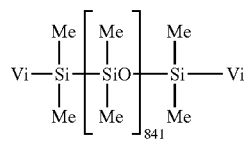

(Component A2-1)

Alkenyl group-containing polysiloxane expressed by the following formula (vinyl group content: 0.49 mass %)

[Formula 3]

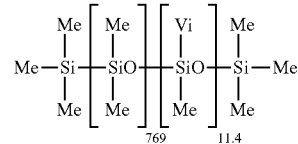

(Component A2-2)

Alkenyl group-containing polysiloxane expressed by the following formula (vinyl group content: 0.3 mass %)

[Formula 4]

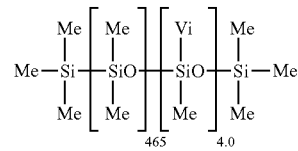

(Component B)

Vinyl functional polydimethylsiloxane, gum-like state (degree of polymerization 2000), vinyl group content: 0.21 mass %

(Component C)

MQ silicone resins containing $(CH_3)_3SiO_{1/2}$ units, $SiO_{4/2}$ units, and hydroxyl groups, weight average molecular weight (Mw) 6500 calculated as polystyrene, OH content 4.5 mol % (1.0 mass %), xylene solution (solid content: 70 mass %)

(Component D1)

Methylhydrogen polysiloxane blocked at both ends of the molecular chain with trimethylsiloxy groups (viscosity at 25° C.: 20 mm$^2$/s, SiH content: 1.59%)

(Component D2)

Dimethylsiloxane-methylhydrogensiloxane copolymer blocked with trimethylsiloxy groups at both ends of a molecular chain (mass average molecular weight 1600, SiH content: 0.73 mass %)

(Component E)

Platinum catalyst: 1,3-divinyl-1,1,3,3-tetramethyldisiloxane platinum complex (Amount of platinum: 40 ppm)

(Component F)

Organic solvent: Toluene (Curing Retarder)

3-Methyl-1-butin-3-ol (abbreviated as "methyl butynol" in the table)

TABLE 1

| Component | Example 1 | Example 2 | Example 3 | Example 4 | Example 5 |
| --- | --- | --- | --- | --- | --- |
| Component A-1 | 100.0 | 100 | 100.0 | 100.0 | 100.0 |
| Component A-2 | 40.1 | 39.6 | 39.5 | | 182.6 |
| Component A-3 | 45.8 | 45.8 | 46.1 | 38.2 | 154.8 |
| Component B-1 | 7.32 | 7.97 | 7.55 | 33.4 | 0.5 |
| Component C | 22.2 | 37.4 | 50.09 | 44.4 | 0 |
| Component D1 | 20.5 | 20.4 | 20.7 | 12.9 | 0 |
| Component D2 | | | | | 11.6 |
| Amount of solvent* (mass %) | 20 | 20 | 20 | 50 | 11.1 |

TABLE 1-continued

| Component | | | | | |
|---|---|---|---|---|---|
| SiH/Vi ratio | 20.3 | 20.2 | 20.4 | 20.4 | 1.41 |
| Amount of platinum ppm | 40 ppm | 40 ppm | 40 ppm | 40 ppm | 40 ppm |
| Methyl butynol | 0.4 | 0.4 | 0.4 | 0.4 | 0.4 |
| Viscosity (mPa · s) | 8000 | 8300 | 8000 | 7400 | 8800 |
| Adhesive residue on film surface | | | No adhesive residue | | |
| Adhesion ** | ○ | ○ | ○ | ○ | ○ |
| Removability *** | ○ | ○ | ○ | ○ | ○ |
| Haze | ○ | ○ | ○ | Δ | ○ |

| Component | Example 6 | Example 7 | Comparative Example 1 | Comparative Example 2 | Comparative Example 3 |
|---|---|---|---|---|---|
| Component A-1 | 100.0 | 100.0 | 100.0 | 100.0 | 100.0 |
| Component A-2 | 89.0 | 40.3 | | | |
| Component A-3 | 249.8 | 45.1 | | | |
| Component B-1 | 0.5 | 7.5 | 157.2 | 208.8 | 0 |
| Component C | 0 | 0 | 66.6 | 80 | |
| Component D1 | 0 | 6 | 9.66 | 11.6 | 0.5 |
| Component D2 | 10.2 | 0 | | | |
| Amount of solvent* (mass %) | 11.1 | 25 | 120 | 120 | 120 |
| SiH/Vi ratio | 2.35 | 5.56 | 9.8 | 9.3 | 9.9 |
| Amount of platinum ppm | 40 ppm | 40 ppm | 40 ppm | 40 ppm | 40 ppm |
| Methyl butynol | 0.4 | 0.4 | 0.4 | 0.4 | 0.4 |
| Viscosity (mPa · s) | 7400 | 9000 | 9000 | 12000 | 40000 |
| Adhesive residue on film surface | | | | | |
| Adhesion ** | ○ | ○ | ○ | ○ | ○ |
| Removability *** | ○ | ○ | Δ | Δ | x |
| Haze | ○ | ○ | x | x | ○ |

*Mass % of organic solvent (toluene) based on 100 mass parts of the sum of components A to D
** Adhesion to glass surface
*** Removability from glass surface after 48 hours at 85° C.

[Summary]

The curable silicone compositions of Examples 1 to 7 were within the viscosity range sufficient for practical coating despite being low solvent compositions, and were superior in terms of curing of the resulting adhesive layer as well as adhesion/removal properties to the substrate.

On the other hand, if the amount of component (B) is too high, as in Comparative Examples 1 and 2, a low haze value of the cured product cannot be achieved and the removability after high temperature storage is insufficient. When component (B) is absent, removability after high temperature storage deteriorates significantly, as in Comparative Example 3.

The invention claimed is:

1. A curable silicone composition, comprising:
   100 mass parts of (A) a straight chain or branched chain organopolysiloxane having at least two aliphatic unsaturated carbon-carbon bond-containing groups in a molecule and a degree of siloxane polymerization within a range of 10 to 1000;
   1 to 100 mass parts of (B) a straight chain or branched chain organopolysiloxane having at least two aliphatic unsaturated carbon-carbon bond-containing groups in a molecule and having a degree of siloxane polymerization within a range of 1001 to 10,000 for 100 mass parts of component (A);
   0 to 100 mass parts of (C) an organopolysiloxane resin, containing in a molecule, siloxane units expressed by $R_3SiO_{1/2}$ where R mutually independently represents a monosaturated organic group and siloxane units expressed by $SiO_{4/2}$, for 100 mass part of component (A);
   (D) a polyorganohydrogen siloxane; and
   (E) a catalytic amount of a hydrosilylation reaction catalyst;
   and optionally, further comprising:
   0 to 60 mass parts of (F) an organic solvent, for 100 mass parts of the sum of components (A) to (D);
   wherein component (A) is a mixture of:
   (A1) a straight chain or branched chain organopolysiloxane having at least two aliphatic unsaturated carbon-carbon bond-containing groups only at both ends of the molecular chain and a degree of siloxane polymerization in a range of 10 to 1000; and
   (A2) a straight chain or branched chain organopolysiloxane having at least one or more aliphatic unsaturated carbon-carbon bond-containing groups at locations other than the terminals of the molecular chain and having at least three or more aliphatic unsaturated carbon-carbon bond-containing groups in a molecule, and a degree of siloxane polymerization in a range of 10 to 1000;
   at a (A1):(A2) mass ratio of 30:70 to 70:30.

2. The curable silicone composition according to claim 1, wherein the amount of aryl or aralkyl groups bonded to silicon atoms in the molecule of components (A) and (B) is less than 0.1 mol % of the total number of groups bonded to silicon atoms in these components.

3. The curable silicone composition according to claim 1, wherein component (C) is present and is an organopolysiloxane resin with a mass average molecular weight in a range of 1,000 to 10,000, and the amount of the organopolysiloxane resin with a molecular weight of 100,000 or more is 1% by mass or less of the total.

4. The curable silicone composition according to claim 1, wherein the average number of siloxane units between two aliphatic unsaturated carbon-carbon bond-containing groups in component (A2) is from 30 to 200.

5. The curable silicone composition according to claim 1, wherein component (D) is a straight chain or branched chain organohydrogen polysiloxane having at least one or more silicon atom-bonded hydrogen atoms at locations other than the terminals of the molecular chain, and the ratio of the number of moles of silicon atom-bonded hydrogen atoms in component (D) to the number of moles of aliphatic unsaturated carbon-carbon bond-containing groups in component (A) and component (B) is within a range of 0.1 to 40.

6. The curable silicone composition according to claim 1, wherein the total haze value of a cured film is 2.0 or less when the curable silicone composition is cured on a PET film to form a cured film with a thickness of 75 μm.

7. A silicone cured product, obtained by curing the curable silicone composition according to claim 1.

8. The curable silicone composition according to claim 1, wherein component (C) is present.

9. The curable silicone composition according to claim 8, wherein component (F) is present.

10. The curable silicone composition according to claim 1, wherein component (F) is present.

11. A curable silicone composition, comprising:
(A) a straight chain or branched chain organopolysiloxane having at least two aliphatic unsaturated carbon-carbon bond-containing groups in a molecule and a degree of siloxane polymerization within a range of 10 to 1000;
(B) a straight chain or branched chain organopolysiloxane having at least two aliphatic unsaturated carbon-carbon bond-containing groups in a molecule and having a degree of siloxane polymerization within a range of 1001 to 10,000 for 100 mass parts of component (A);
(C) an organopolysiloxane resin, containing in a molecule, siloxane units expressed by $R_3SiO_{1/2}$ where R mutually independently represents a monosaturated organic group and siloxane units expressed by $SiO_{4/2}$, for 100 mass part of component (A);
(D) a polyorganohydrogen siloxane; and
(E) a catalytic amount of a hydrosilylation reaction catalyst;
and optionally, further comprising:
(F) an organic solvent, for 100 mass parts of the sum of components (A) to (D);
wherein when the total amount of components (A) and (B) is 100 mass parts;
the total amount of components (A) and (B) is within a range of 65 to 99 mass parts;
the amount of component (C) is within a range of 0 to 40 mass parts;
the amount of component (D) is within a range of 0.01 to 15 mass parts; and
the amount of component (F) is within a range of 0 to 25 mass parts.

12. The curable silicone composition according to claim 11, wherein the amount of aryl or aralkyl groups bonded to silicon atoms in the molecule of components (A) and (B) is less than 0.1 mol % of the total number of groups bonded to silicon atoms in these components.

13. The curable silicone composition according to claim 11, wherein component (C) is present and is an organopolysiloxane resin with a mass average molecular weight in a range of 1,000 to 10,000, and the amount of the organopolysiloxane resin with a molecular weight of 100,000 or more is 1% by mass or less of the total.

14. The curable silicone composition according to claim 11, wherein component (A) is a mixture of:
(A1) a straight chain or branched chain organopolysiloxane having at least two aliphatic unsaturated carbon-carbon bond-containing groups only at both ends of the molecular chain and a degree of siloxane polymerization in range of 10 to 1000; and
(A2) a straight chain or branched chain organopolysiloxane having at least one or more aliphatic unsaturated carbon-carbon bond-containing groups at locations other that the terminals of the molecular chain and having at least three or more aliphatic unsaturated carbon-carbon bond-containing groups in a molecule, and a degree of siloxane polymerization in a range of 10 to 1000;
at a (A1):(A2) mass ration of 30:70 to 70:30.

15. The curable silicone composition according to claim 14, wherein the average number of siloxane units between two aliphatic unsaturated carbon-carbon bond-containing groups in component (A2) is from 30 to 200.

16. The curable silicone composition according to claim 11, wherein component (D) is a straight chain or branched chain organohydrogen polysiloxane having at least one or more silicon atom-bonded hydrogen atoms at locations other that the terminals of the molecular chain, and the ratio of the number of moles of silicon atom-bonded hydrogen atoms in component (D) to the number of moles of aliphatic unsaturated carbon-carbon bond-containing groups in component (A) and component (B) is within a range of 0.01 to 40.

17. The curable silicone composition according to claim 11, wherein the total haze value of a cured film is 2.0 or less when the curable silicone composition is cured on a PET film to form a cured film with a thickness of 75 μm.

18. A silicone cured product, obtained by curing the curable silicone composition according to claim 11.

19. The curable silicone composition according to claim 11, wherein component (C) is present.

20. The curable silicone composition according to claim 11, wherein component (F) is present.

* * * * *